US008815427B2

(12) United States Patent  
Machida (10) Patent No.: US 8,815,427 B2
(45) Date of Patent: *Aug. 26, 2014

(54) SPIRALLY WOUND NON-AQUEOUS ELECTROLYTE SECONDARY BATTERY HAVING INSULATING MEMBERS

(75) Inventor: Masaki Machida, Fukushima (JP)

(73) Assignee: Sony Corporation, Tokyo (JP)

( * ) Notice: Subject to any disclaimer, the term of this patent is extended or adjusted under 35 U.S.C. 154(b) by 177 days.

This patent is subject to a terminal disclaimer.

(21) Appl. No.: 13/415,563

(22) Filed: Mar. 8, 2012

(65) Prior Publication Data

US 2012/0214061 A1  Aug. 23, 2012

Related U.S. Application Data (63) Continuation of application No. 12/114,400, filed on May 2, 2008, now Pat. No. 8,137,832.

(30) Foreign Application Priority Data

May 7, 2007 (JP) .................................. 2007-122224

(51) Int. Cl.
 *H01M 4/00* (2006.01)
(52) U.S. Cl.
 USPC .............. 429/94; 429/246; 429/211; 429/142
(58) Field of Classification Search
 USPC ........... 429/94, 246, 234, 233, 237, 245, 129, 429/211, 142, 130
 See application file for complete search history.

(56) References Cited

U.S. PATENT DOCUMENTS

| 6,682,853 | B2 | 1/2004 | Kimijima et al. |
| 8,137,832 | B2 * | 3/2012 | Machida .................... 429/94 |
| 2006/0093898 | A1 * | 5/2006 | Kwak et al. .................. 429/94 |
| 2007/0059605 | A1 * | 3/2007 | Nakamura et al. .......... 429/246 |

FOREIGN PATENT DOCUMENTS

| JP | 2008-153542 | 6/1996 |
| JP | 2008-264206 | 10/1996 |
| JP | 2000-188115 | 7/2000 |
| JP | 2001-167798 | 6/2001 |
| JP | 2003-059540 | 2/2003 |
| JP | 2004-063343 | 2/2004 |
| JP | 2004-146222 | 5/2004 |
| JP | 2004-164867 | 6/2004 |
| JP | 2005-222884 | 8/2005 |
| JP | 2001-266946 | 12/2005 |
| JP | 2005-347161 | 12/2005 |

* cited by examiner

OTHER PUBLICATIONS

Japanese Office Action issued on Mar. 24, 2009, for corresponding Japanese Patent Application JP 2007-122224.

*Primary Examiner* — Raymond Alejandro
(74) *Attorney, Agent, or Firm* — K&L Gates LLP

(57) ABSTRACT

A spirally-wound non-aqueous electrolyte secondary battery including a staked electrode assembly is disclosed. The stacked electrode assembly has first and second current collectors facing region disposed at a winding start end and at a winding terminal end, respectively. A positive electrode current collector exposed portion and a negative electrode current collector exposed portion face each other through the separator in each of the first and second current collector facing regions. At least one of the positive or negative electrode current collector exposed portion has a first insulating member formed thereon in the first current collector facing region at the winding start end. At least one of the positive or negative electrode current collector exposed portion has a second insulating member formed thereon in the second current collector facing region at the winding terminal end.

10 Claims, 4 Drawing Sheets

SPIRALLY WOUND NON-AQUEOUS ELECTROLYTE SECONDARY BATTERY HAVING INSULATING MEMBERS

CROSS-REFERENCE TO RELATED APPLICATIONS

The present application is a Continuation of U.S. patent application Ser. No. 12/114,400 filed on May 2, 2008, now U.S. Pat. No. 8,137,832, which claims priority to Japanese patent Application No. 2007-122224 filed in the Japanese Patent Office on May 7, 2007, the entire contents of which are incorporated herein by reference.

BACKGROUND

The present disclosure relates a non-aqueous electrolyte secondary battery having a spirally-wound battery element.

In recent years, cordless or portable electronic devices, such as cellular phones and laptop personal computers, have advanced, and a thin, small, and lightweight portable electronic devices have been developed. The electronic devices have increased functions and hence need increased electric power. For this, there is an increasing demand for battery as an energy source of the electronic devices to satisfy the requirements of high capacity and lightness in weight.

As a secondary battery that meets the demands, for example, with respect to the non-aqueous electrolyte secondary battery utilizing doping with lithium ions and dedoping, various proposals have been made.

The non-aqueous electrolyte secondary battery has a positive electrode including a cathode active material layer using a lithium composite oxide, such as $LiCoO_2$ or $LiNiO_2$, formed on a positive electrode current collector, and a negative electrode including an anode active material layer using a carbon material capable of being doped with lithium and dedoped, such as graphite or a hardly graphitizable carbon material, formed on a negative electrode current collector. A separator is disposed between the positive electrode and the negative electrode, and they are spirally wound together to form a battery element. The non-aqueous electrolyte secondary battery having such a structure has an increased area for the reaction of electrodes, thereby achieving excellent discharge characteristics.

For improving the safety, the above non-aqueous electrolyte secondary battery has a structure such that, as described in Japanese Unexamined Patent Application Publication No. 2000-188115, Japanese Unexamined Patent Application Publication No. 2001-266946, and Japanese Unexamined Patent Application Publication No. 2005-347161, at the respective winding terminal ends of the positive electrode and negative electrode, portions onto which the active materials are not applied. That is, a positive electrode current collector exposed portion and a negative electrode current collector exposed portion are formed so that the voltage can be quickly lowered, for example, even if the battery is penetrated with a metallic nail or the battery is crushed by an external pressure, thus minimizing the damage of the battery. In this structure, an insulating material is formed on a portion which is likely to damage the separator or which easily causes short-circuiting, preventing the occurrence of short-circuiting and the like. The examples of the portions on which the insulating material is formed include: the positive electrode end and negative electrode end having burrs or the like caused due to the cutting of electrode, portions opposite to these electrode ends, portions having steps such as an end of the cathode active material layer and an end of the anode active material layer, and portions opposite to these ends.

In the above patent documents, a resin material having a high melting point, such as polyimide (PI), polyphenylene sulfide (PPS), or polyethylene terephthalate (PET), is used as an insulating material. The use of the high melting-point resin material enables to maintain the insulation effect without melting the covering material even when the temperature inside the battery is elevated.

However, when a battery charger malfunctions or a battery pack having incorporated the non-aqueous electrolyte secondary battery is mistakenly used, there is a possibility that the temperature in the non-aqueous electrolyte secondary battery is elevated and heat remains inside the battery, so that short-circuiting occurs through the positive electrode current collector and negative electrode current collector. In such a case, the battery having the structure described in Japanese Unexamined Patent Application Publication No. 2000-188115, Japanese Unexamined Patent Application Publication No. 2001-266946, and Japanese Unexamined Patent Application Publication No. 2005-347161 cannot achieve discharge of the battery quickly, and causes large temperature elevation in the battery, whereby the non-aqueous electrolyte secondary battery or battery pack becomes deformed.

Accordingly, it is desirable to provide a spirally-wound non-aqueous electrolyte secondary battery having improved safety.

SUMMARY

In accordance with an embodiment, there is provided a spirally-wound non-aqueous electrolyte secondary battery including a stacked electrode assembly which includes: a positive electrode including a cathode active material layer formed on at least one side of a positive electrode current collector; a negative electrode including an anode active material layer formed on at least one side of a negative electrode current collector; and a separator disposed between the positive electrode and the negative electrode, the positive electrode, the negative electrode, and the separator being spirally wound together. The stacked electrode assembly has a first current collector facing region and a second current collector facing region disposed at a winding start end and at a winding terminal end, respectively. A positive electrode current collector exposed portion and a negative electrode current collector exposed portion face each other through the separator in each of the first and second current collector facing regions. The positive electrode current collector is exposed in the positive electrode current collector exposed portion. The negative electrode current collector is exposed in the negative electrode current collector exposed portion. At least one of the positive electrode current collector exposed portion or the negative electrode current collector exposed portion has a first insulating member formed thereon in the first current collector facing region at the winding start end. At least one of the positive electrode current collector exposed portion or the negative electrode current collector exposed portion has a second insulating member formed thereon in the second current collector facing region at the winding terminal end. The second insulating member has a melting point lower than that of the first insulating member.

The difference between the melting point of the first insulating member and the melting point of the second insulating member may 20° C. or higher, preferably 100° C. or higher.

The first insulating member may be selected from the group consisting of a polypropylene resin, a polyethylene terephthalate resin, a polyethylene naphthalate resin, a polyphenylene sulfide resin, and a polyimide resin. It is preferred that the second insulating member is selected from a low density polyethylene resin, a high density polyethylene resin, a polypropylene resin, a polyethylene terephthalate resin, a polyethylene naphthalate resin, and a polyphenylene sulfide resin.

The melting point of the second insulating member formed in the outer side of the battery may be lower than that of the first insulating member formed in the inner side of the battery. As a result, if the temperature inside the battery becomes high, the second insulating member formed in the outer side of the battery is melted sooner than the first insulating member. Consequently, the outer side of the battery surely causes short-circuiting sooner than the other portions in the battery. Accordingly, the battery voltage can be lowered while removing heat in the outer side of the battery, and therefore a storage heat within the battery is reduced, so that short-circuiting is unlikely to occur in the inner side of the battery.

The first insulating member may be formed on both sides of the positive electrode current collector exposed portion at the winding start end of the positive electrode, and the second insulating member may be formed on both sides of the positive electrode current collector exposed portion at the winding terminal end of the positive electrode.

The first insulating member and the second insulating member may not be formed in the negative electrode.

The first insulating member and second insulating member may be formed so that the positive electrode current collector exposed portion and the negative electrode current collector exposed portion could not face each other through only the separator.

The first insulating member and second insulating member may be formed at both ends of the negative electrode.

The first insulating member and second insulating member may be individually formed on each of the positive electrode and the negative electrode.

The first insulating member may be formed on the positive electrode and the second insulating member may be formed on the negative electrode.

Additional features and advantages are described herein, and will be apparent from the following Detailed Description and the figures.

DETAILED DESCRIPTION

Hereinbelow, an embodiment will be described with reference to the accompanying drawings.

Figure 1A:
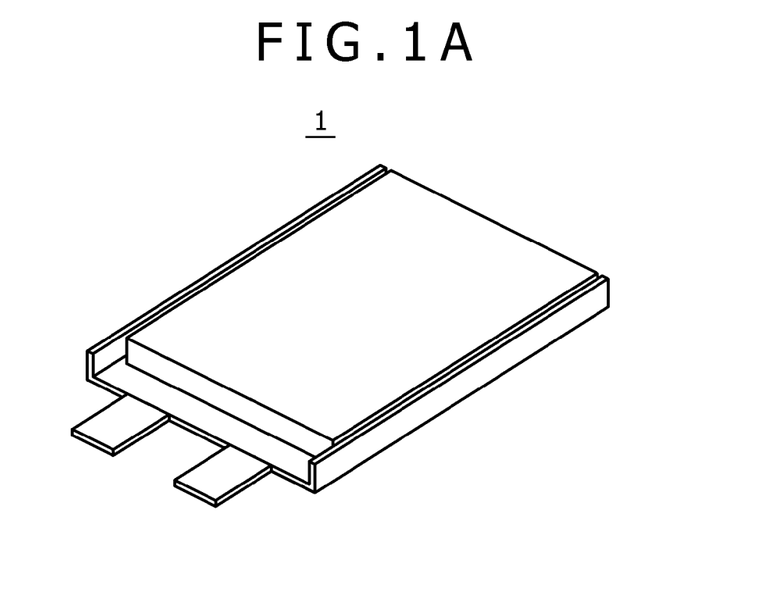
FIGS. 1A and 1B are diagrammatic views showing the structure of a spirally-wound non-aqueous electrolyte secondary battery according to one embodiment.
Figure 1B:
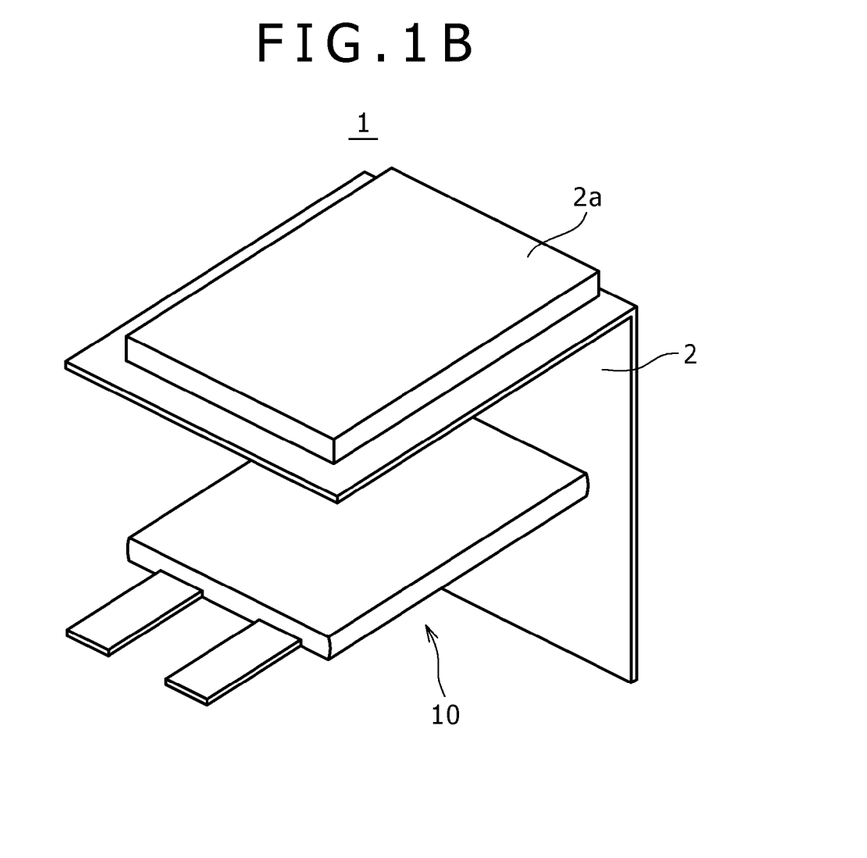

FIG. 1A shows the structure of a spirally-wound non-aqueous electrolyte secondary battery 1 according to an embodiment. As shown in FIG. 1B, specifically, the spirally-wound non-aqueous electrolyte secondary battery 1 includes a battery element 10 contained in and covered with a housing portion 2a formed in a laminated film 2, wherein the laminated film around the battery element 10 is sealed. The structure of the battery element 10 is described below.

Battery Element

Figure 2:
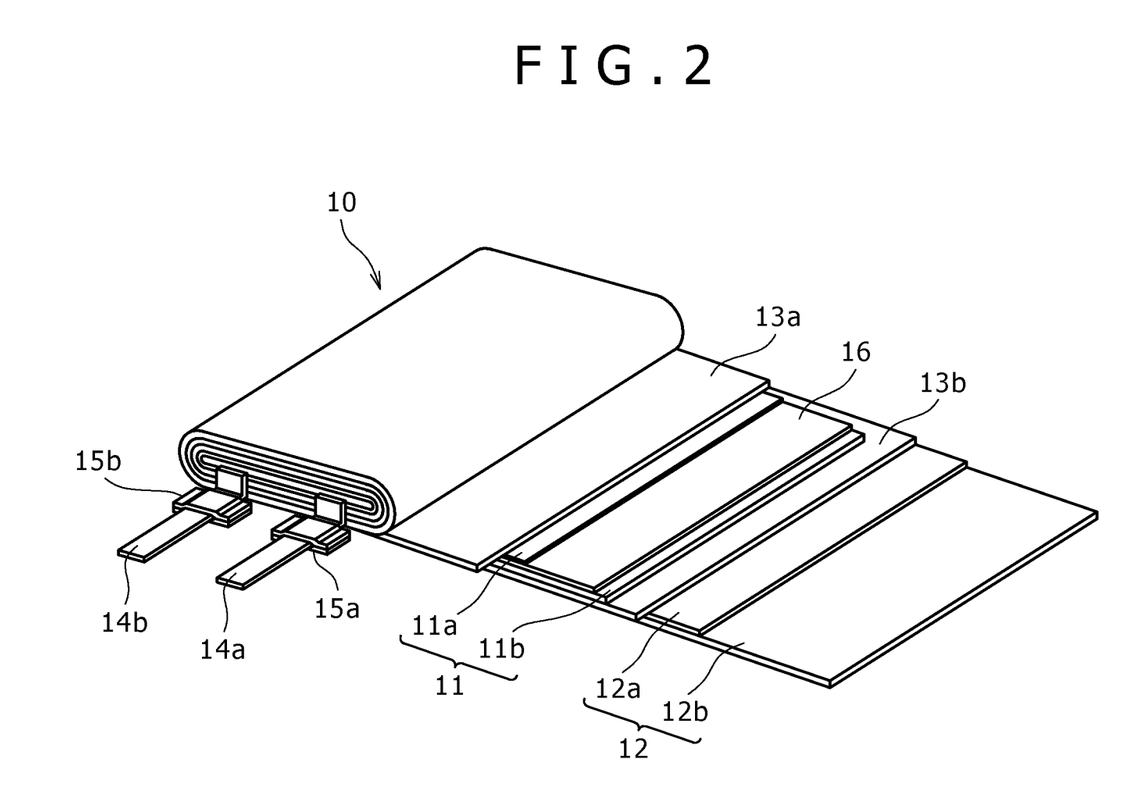
FIG. 2 is a diagrammatic view showing the structure of a battery element in one embodiment.

FIG. 2 shows the structure of the battery element 10 housed in the laminated film 2. The battery element 10 includes a strip positive electrode 11, a strip negative electrode 12, and a separator 13, which are stacked alternately and spirally wound together in the longitudinal direction. At the winding start end corresponding to the battery innermost end and at the winding terminal end corresponding to the battery outermost end of the positive electrode 11 and/or negative electrode 12, respectively, a portion in which a positive electrode current collector 11b is exposed, i.e., a positive electrode current collector exposed portion, and a portion in which a negative electrode current collector 12b is exposed, i.e., a negative electrode current collector exposed portion, are formed, and an insulating member 16 is formed individually on the positive electrode current collector exposed portion and negative electrode current collector exposed portion. Each of the positive electrode 11 and the negative electrode 12 has a gel electrolyte (not shown) applied onto the both sides. A positive electrode terminal 14a connected to the positive electrode 11 and a negative electrode terminal 14b connected to the negative electrode 12 (hereinafter, referred to as "electrode terminal 14" when the terminal is not specified) are extended outside the battery element 10, and the positive electrode terminal 14a and negative electrode terminal 14b are respectively covered with sealants 15a and 15b as resin pieces for improving the adhesion with the laminated film 2 which covers the battery element later.

Figure 3:
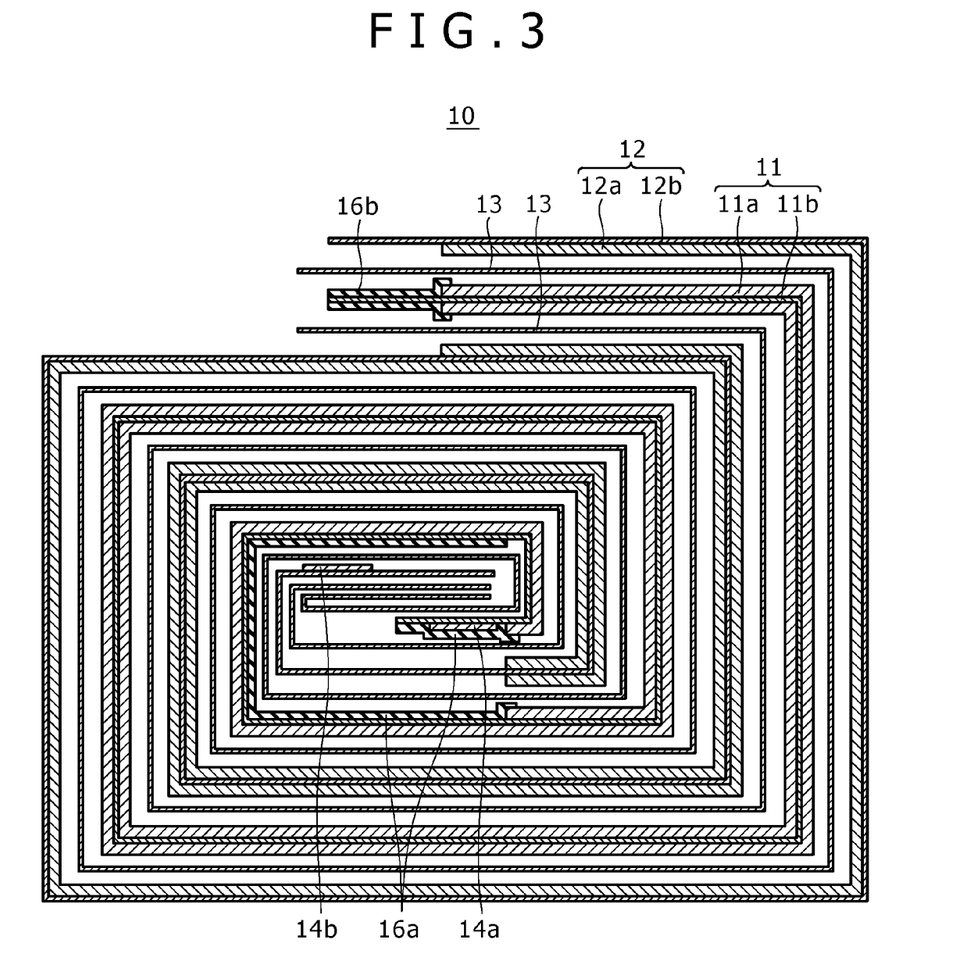
FIG. 3 is a cross-sectional view showing the structure of a battery element in one embodiment.

FIG. 3 is a cross-sectional view of the battery element 10. In the battery element 10 shown in FIG. 3, the positive electrode 11 has an insulating member 16a formed on both sides of the positive electrode current collector exposed portion at the winding start end and has an insulating member 16b having a melting point lower than that of the insulating member 16a formed on both sides of the positive electrode current collector exposed portion at the winding terminal end. The negative electrode 12 has no insulating member. Further, the insulating members 16a and 16b are formed so that the positive electrode current collector exposed portion and the negative electrode current collector exposed portion do not face each other through only the separator 13.

Figure 4A:
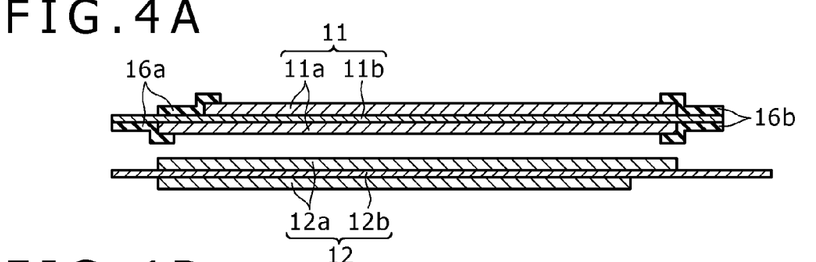
FIGS. 4A to 4E are diagrammatic views showing the structure of a positive electrode and a negative electrode in one embodiment.
Figure 4B:
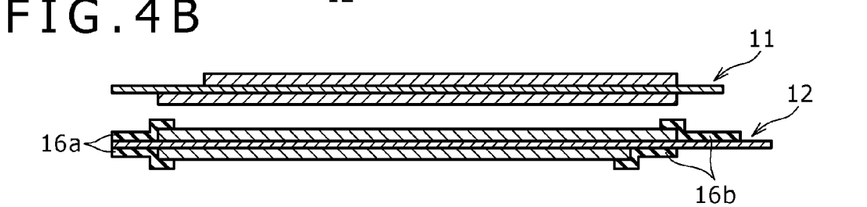
Figure 4C:
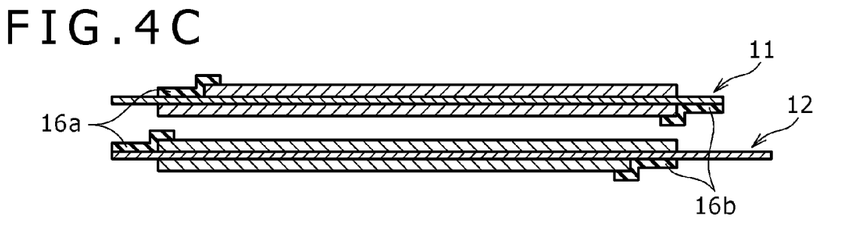
Figure 4D:
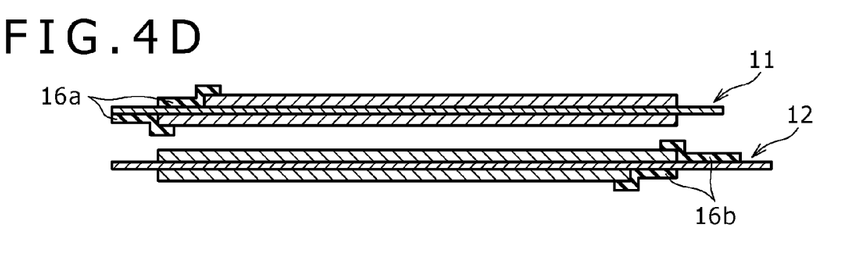
Figure 4E:
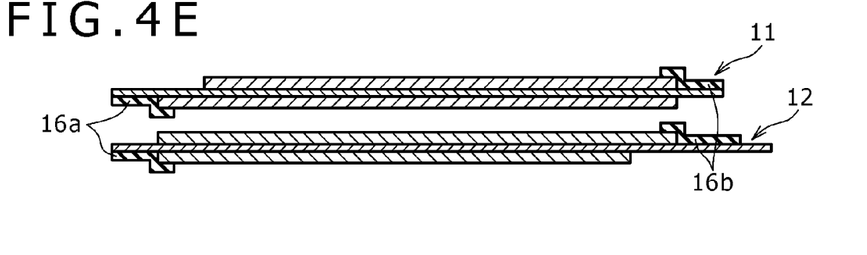

FIG. 4A is a diagrammatic view showing the structure of the positive electrode 11 and negative electrode 12 used in the battery element 10 of FIG. 3. In the figure, an arrow indicated by X points the winding start end, and an arrow indicated by Y points the winding terminal end. FIGS. 4B to 4E show other examples of the positions in which the insulating members 16 are formed. FIG. 4B shows an example in which the insulating members 16a and 16b are formed at both ends of the negative electrode 12, respectively. FIGS. 4C and 4E show examples in which the insulating members 16a and 16b are individually formed on each of the positive electrode 11 and the negative electrode 12. FIG. 4D shows an example in which the insulating member 16a is formed on the positive electrode 11 and the insulating member 16b is formed on the negative electrode 12.

Positive Electrode

The positive electrode 11 includes a cathode active material layer 11a including a cathode active material and being formed on a positive electrode current collector 11b. The positive electrode current collector 11b is composed of a metallic foil, such as an aluminum (Al) foil, a nickel (Ni) foil, or a stainless steel (SUS) foil.

The cathode active material layer 11a includes, for example, a cathode active material, a conductor, and a binder.

As a cathode active material, a metal oxide, a metal sulfide, or a specific polymer is used according to the type of a desired battery. For example, when a lithium ion battery is formed, a composite oxide of lithium and a transition metal, which is composed mainly of $Li_xMO_2$ (wherein M represents at least one transition metal, and x varies depending on the charged or discharged state of the battery, and is generally 0.5 to 1.10), is used. As a transition metal constituting the lithium composite oxide, cobalt (Co), nickel (Ni), manganese (Mn), or the like is used.

Specific examples of the lithium composite oxides include $LiCoO_2$, $LiNiO_2$, $LiMn_2O_4$, and $LiNi_yCo_{1-y}O_2$ (0<y<1). A solid solution obtained by replacing part of the transition metal element in the lithium composite oxide by another element may be used. Examples of the solid solutions include $LiNi_{0.5}Co_{0.5}O_2$ and $LiNi_{0.8}CO_{0.2}O_2$. These lithium composite oxides can generate high voltage and have excellent energy density. Alternatively, as a cathode active material, a metal sulfide or oxide containing no lithium, such as $MnO_2$, $TiS_2$, $TiS_3$, $MoS_3$, $MoO_3$, $FeS_2$, $Fe_2O_3$, $Fe_3O_4$, $NbSe_2$, $V_2O_5$, or $V_6O_{13}$, may be used. These cathode active materials may be used individually or in combination.

As a conductor, a carbon material, such as carbon black or graphite, is used. As a binder, for example, polyvinylidene fluoride (PVdF) or polytetrafluoroethylene (PTFE) is used. As a solvent, for example, N-methyl-2-pyrrolidone (NMP) is used.

Negative Electrode

The negative electrode 12 includes an anode active material layer 12a including an anode active material and being formed on a negative electrode current collector 12b. The negative electrode current collector 12b is composed of a metallic foil, such as a copper (Cu) foil, a nickel (Ni) foil, or a stainless steel (SUS) foil.

The anode active material layer 12a includes, for example, an anode active material, and optionally a conductor and a binder. As an anode active material, lithium metal, a lithium alloy, a carbon material capable of being doped with lithium and dedoped, or a composite material of a metal material and a carbon material is used. Specific examples of carbon materials capable of being doped with lithium and dedoped include graphite, hardly graphitizable carbon, and easily graphitizable carbon. More specifically, a carbon material, such as pyrolytic carbon, coke (pitch coke, needle coke, or petroleum coke), graphite, glassy carbon, a calcined product of an organic polymer compound (obtained by carbonizing a phenolic resin, a furan resin, or the like by calcination at an appropriate temperature), carbon fiber, or activated carbon, can be used. Further, as a material capable of being doped with lithium and dedoped, a polymer, such as polyacetylene or polypyrrole, or an oxide, such as $SnO_2$, may be used.

As a material capable of being alloyed with lithium, various types of metals may be used, but tin (Sn), cobalt (Co), indium (In), aluminum (Al), silicon (Si), or an alloy thereof is generally used. When using metallic lithium, it is not always necessary to mix lithium powder with a binder to form a coating film, and a method may be employed in which a rolled lithium (Li) metallic foil is bonded with a current collector by pressing.

As a binder, for example, polyvinylidene fluoride (PVdF) or a styrene-butadiene rubber (SBR) is used. As a solvent, for example, N-methyl-2-pyrrolidone (NMP) or methyl ethyl ketone (MEK) is used.

Insulating Member

With respect to the insulating members 16 (16a, 16b), for example, an insulating tape including the insulating member 16a and 16b as a substrate having an adhesive layer formed thereon is used. As the insulating members 16 (16a, 16b), a polymer material having insulation properties and a corrosion resistance with respect to the non-aqueous electrolyte and optionally containing an additive is preferably used. The materials for the insulating members 16a and 16b are selected so that the insulating member 16b formed in the outer side of the battery has a melting point lower than the melting point of the insulating member 16a formed in the inner side of the battery.

Examples of the insulating members 16a formed in the inner side of the battery include a polypropylene (PP) resin, a polyethylene terephthalate (PET) resin, a polyethylene naphthalate (PEN) resin, a polyphenylene sulfide (PPS) resin, and a polyimide (PI) resin. Examples of the insulating members 16b formed in the outer side of the battery include a low density polyethylene (LDPE) resin, a high density polyethylene (HDPE) resin, a polypropylene (PP) resin, a polyethylene terephthalate (PET) resin, a polyethylene naphthalate (PEN) resin, and a polyphenylene sulfide (PPS) resin.

With respect to the insulating member 16a formed in the inner side of the battery and the insulating member 16b formed in the outer side of the battery, a combination is selected from the above materials so that the melting point of the insulating member 16b in the outer side of the battery is lower than the melting point of the insulating member 16a in the inner side of the battery. The difference between the melting point of the insulating member 16b in the outer side of the battery and the melting point of the insulating member 16a in the inner side of the battery is preferably 20° C. or higher, more preferably 100° C. or higher. When the difference in melting point between the insulating members 16a and 16b is less than 20° C., the deformation prevention effect of the battery becomes lower. When the difference in melting point between the insulating members 16a and 16b is 100° C. or higher, the deformation prevention effect of the battery is remarkably improved. The melting point of the insulating member is measured in compliance with the method described in JIS K7121.

Each of the insulating members 16a and 16b preferably has a thickness of 10 to 100 μm. When the thickness of each insulating member is more than 100 μm, the volumetric efficiency of the battery tends to be lowered. On the other hand, when the thickness is less than 10 μm, the insulating member is reduced in strength, making it difficult to prevent the occurrence of short-circuiting.

As described above, the melting point of the insulating member 16b is lower than the melting point of the insulating member 16a. As a result, if the battery is subjected to high ambient temperature, the insulating member 16b formed in the outer side of the battery is melted sooner than the insulating member 16a formed in the inner side of the battery, so that the positive electrode current collector 11b and the negative electrode current collector 12b are in contact in the outer side of the battery earlier than those in the other portions in the battery, causing short-circuiting in the outer side of the battery. As a result, the battery voltage can be lowered while heat-discharging in the outer side of the battery, and therefore the heat accumulation within the battery is reduced, so that short-circuiting is unlikely to occur in the inner side of the battery. Thus short-circuiting is unlikely to occur in the inner side of the battery, from which heat-discharging is difficult to remove, and hence abnormal heat generation of the battery and the battery pack deformation can be reduced.

Non-Aqueous Electrolyte

In the non-aqueous electrolyte, an electrolyte salt and a non-aqueous solvent generally used in non-aqueous electrolyte secondary battery can be used.

Specific examples of non-aqueous solvents include ethylene carbonate (EC), propylene carbonate (PC), γ-butyrolactone, dimethyl carbonate (DMC), diethyl carbonate (DEC), ethylmethyl carbonate (EMC), dipropyl carbonate (DPC), ethylpropyl carbonate (EPC), and solvents obtained by replacing the hydrogen in the above carbonates by a halogen. These solvents may be used individually or in combination.

As an electrolyte salt, a material used in a general electrolytic solution for battery may be used. Specific examples include lithium chloride (LiCl), lithium bromide (LiBr), lithium iodide (LiI), lithium chlorate (LiClO$_3$), lithium perchlorate (LiClO$_4$), lithium tetrafluoroborate (LiBF$_4$), lithium hexafluorophosphate (LiPF$_6$), LiNO$_3$, lithium bis(trifluoromethanesulfonyl)imide {LiN(CF$_3$SO$_2$)$_2$}, LiN(C$_2$F$_5$SO$_2$)$_2$, lithium hexafluoroarsenate (LiAsF$_6$), lithium trifluoromethanesulfonate (LiCF$_3$SO$_3$), tris(trifluoromethanesulfonyl)methyllithium {LiC(SO$_2$CF$_3$)$_3$}, lithium tetrachloroaluminate (LiAlCl$_4$), and lithium hexafluorosilicate (LiSiF$_6$). From the viewpoint of achieving excellent oxidative stability, lithium hexafluorophosphate (LiPF$_6$) or lithium tetrafluoroborate (LiBF$_4$) is desired. These lithium salts may be used individually or in combination. The concentration of the lithium salt dissolved in the non-aqueous electrolyte may be any concentration as long as the lithium salt may be dissolved in the above solvent, but the lithium salt concentration (molarity) is preferably in the range of from 0.05 to 5.0 mol/kg. When the lithium salt concentration falls outside of the above range, the conductivity of the electrolytic solution is likely to be lowered.

When using a gel electrolyte, the non-aqueous electrolytic solution is gelled with a matrix polymer to obtain a gel electrolyte. As a matrix polymer, there can be used any polymer which is compatible with the non-aqueous electrolytic solution including the electrolyte salt dissolved in the non-aqueous solvent and which can be gelled. Examples of the matrix polymers include polymers comprising vinylidene fluoride (VdF), ethylene oxide (EO), propylene oxide (PO), acrylonitrile (AN), or methacrylonitrile (MAN) in the repeating units. These polymers may be used individually or in combination.

Of these, especially preferred one is a copolymer including polyvinylidene fluoride (PVdF) or vinylidene fluoride (VdF) as a matrix polymer and hexafluoropropylene (HFP) in an amount of, e.g., 7.5% or less incorporated into the matrix polymer. Such a polymer has a number average molecular weight in the range of from $5.0 \times 10^5$ to $7.0 \times 10^5$ (500,000 to 700,000) or a weight average molecular weight in the range of from $2.1 \times 10^5$ to $3.1 \times 10^5$ (210,000 to 310,000) and an intrinsic viscosity in the range of from 1.7 to 2.1.

Separator

The separator 13 is composed of a porous film made of a polyolefin material, such as polyethylene (PE) or polypropylene (PP), or a porous film made of an inorganic material, such as ceramic nonwoven fabric.

From the viewpoint of achieving both excellent shut-down performance and excellent float characteristics, it is more preferred that polyethylene (PE) having a lower shut-down temperature and polypropylene (PP) having excellent oxidation resistance are used in combination in the form of a stacked material or a mixture.

Generally, the usable separator preferably has a thickness of 5 to 50 μm, more preferably 7 to 30 μm. When the separator has too large thickness, the ratio of the active material to the separator is reduced to lower the battery capacity, and further the ion conduction properties become poor, so that the current properties become poor. On the other hand, when the separator has too small thickness, the film of separator is reduced in mechanical strength.

The spirally-wound non-aqueous electrolyte secondary battery 1 thus structured is produced, for example, as follows.

Preparation of Positive Electrode and Negative Electrode

The cathode active material, binder, and conductor are intimately mixed with one another to prepare a cathode composition, and the cathode composition prepared is dispersed in a solvent to form a cathode composition slurry. Then, the cathode composition slurry is uniformly applied to the positive electrode current collector 11b by a doctor blade method or the like.

When applying the cathode composition slurry, the cathode composition is applied so that a portion onto which the cathode composition is not applied (hereinafter, frequently referred to as "positive electrode current collector exposed portion") is formed at both ends of the positive electrode current collector 11b. Subsequently, the cathode composition applied is dried at a high temperature to remove the solvent, forming a cathode active material layer 11a.

Then, the anode active material and optionally a conductor and a binder are intimately mixed with one another to prepare an anode composition, and the anode composition prepared is dispersed in a solvent to prepare an anode composition slurry. Then, the anode composition slurry is uniformly applied to the negative electrode current collector 12b by the same method as that used for the positive electrode.

When applying the anode composition slurry, the anode composition is applied so that a portion onto which the anode composition is not applied (hereinafter, frequently referred to as "negative electrode current collector exposed portion") is formed at both ends of the negative electrode current collector 12b. The negative electrode current collector exposed portion and the positive electrode current collector exposed portion face each other in a region in which the positive electrode 11 and negative electrode 12 are arranged opposite to each other. Subsequently, the anode composition applied is dried at a high temperature to remove the solvent, forming an anode active material layer 12a.

Then, in the positive electrode 11 and negative electrode 12, insulating members 16a and 16b are formed, respectively, on one end of the positive electrode 11 and/or negative electrode 12 corresponding to the innermost end of the wound structure and on the other end of the positive electrode 11 and/or negative electrode 12 corresponding to the outermost end of the wound structure. As shown in FIGS. 4A to 4E, the insulating members 16a and 16b are formed so that the positive electrode current collector, exposed portion and the negative electrode current collector exposed portion are not adjacent to each other through only the separator 13, for example, the electrode ends having burrs caused due to cutting or portions opposite to the electrode ends are covered with the insulating members 16a and 16b. When forming the insulating members, as described above, the resin materials for the insulating members are selected so that the melting point of the insulating member 16b formed in the outer side of the wound structure is lower than the melting point of the insulating member 16a formed in the inner side of the wound structure.

A positive electrode terminal 14a is connected to one end of the positive electrode current collector 11b of the positive electrode 11 by, e.g., spot welding or ultrasonic welding. It is desired that the positive electrode terminal 14a is composed of a metallic foil or mesh, but the positive electrode terminal may be composed of any material other than metals as long as it is electrochemically and chemically stable and electrically conductive. Aluminum (Al) is used as an example of the material for the positive electrode terminal 14a.

As in the case of the positive electrode 11, the negative electrode 12 has a negative electrode terminal 14b connected to one end of the negative electrode current collector by spot welding or ultrasonic welding, and the negative electrode terminal 14b may be composed of any material other than metals as long as it is electrochemically and chemically stable and electrically conductive. Examples of materials for the negative electrode terminal 14b include copper (Cu) and nickel (Ni).

It is preferred that the positive electrode terminal 14a and negative electrode terminal 14b are extended from the same direction, but they may be extended from any directions as long as short-circuiting or the like does not occur and there is no adverse effect on the battery performance. With respect to the connection of the positive electrode terminal 14a and the negative electrode terminal 14b, the connecting position and the method for the connection are not limited to the examples described above as long as electrical contact can be made.

Production of Battery

The gel electrolyte solution prepared is uniformly applied to the positive electrode 11 and negative electrode 12 so that the cathode active material layer 11a and anode active material layer 12a are individually impregnated with the gel electrolyte solution, followed by storage at room temperature or drying, to form a gel electrolyte layer. Then, the positive electrode 11 and negative electrode 12 each having a gel electrolyte layer formed thereon and the separator 13 are stacked alternately to form a stacked electrode assembly, followed by spirally winding, to obtain a battery element 10.

The battery element 10 thus prepared is covered with a laminated film 2 as shown in FIG. 1B, and the laminated film around the battery element 10 is sealed to form a spirally-wound non-aqueous electrolyte secondary battery 1. The spirally-wound non-aqueous electrolyte secondary battery 1 thus produced has the following advantage. When the battery temperature is elevated, the outer side of the battery causes short-circuiting earlier than the other portions in the battery and the battery voltage can be lowered while heat-discharging, and therefore the heat accumulation within the battery is reduced, so that short-circuiting is unlikely to occur in the inner side of the battery. Thus, the abnormal heat generation of the battery can be prevented, and hence the spirally-wound non-aqueous electrolyte secondary battery 1 or a battery pack incorporating the spirally-wound non-aqueous electrolyte secondary battery 1 can be reduced of prevented.

EXAMPLES

The present embodiments will be described in more detail with reference to the following Examples, which should not be construed as limiting the scope of the embodiments.

A test battery is first prepared as follows.

Example 1

Preparation of Positive Electrode

A positive electrode is prepared using $LiCoO_2$ as a cathode active material. Lithium carbonate and cobalt carbonate were first mixed in a 0.5 mol:1.0 mol ratio, and calcined in air at 900° C. for 5 hours to obtain $LiCoO_2$. Then, 87 parts by weight of the $LiCoO_2$ obtained, 5 parts by weight of graphite as a conductor, and 8 parts by weight of polyvinylidene fluoride (PVdF) as a binder were mixed together to prepare a cathode composition, and the cathode composition was dispersed in N-methyl-2-pyrrolidone to form a cathode composition slurry.

Then, the resultant cathode composition slurry was uniformly applied to both sides of a strip aluminum foil having a thickness of 20 μm as a positive electrode current collector. When applying the slurry, positive electrode current collector exposed portions were formed on both sides of the positive electrode current collector at the both ends. Then, the resultant positive electrode current collector was dried and pressed by a roll pressing machine, and cut into 50 mm×330 mm, followed by forming of insulating members at the positions shown in FIG. 4A, thereby obtaining a positive electrode. An insulating member composed of polyimide (PI) was used in the inner side of the battery, and an insulating member composed of polyethylene naphthalate (PEN) was used in the outer side of the battery.

Preparation of Negative Electrode

90 Parts by weight of pulverized artificial graphite powder and 10 parts by weight of polyvinylidene fluoride (PVdF) as a binder were mixed together to prepare an anode composition, and the anode composition prepared was dispersed in N-methyl-2-pyrrolidone to form an anode composition slurry.

Then, the resultant anode composition slurry was uniformly applied to both sides of a strip copper foil having a thickness of 10 μm as a negative electrode current collector. When applying the anode composition slurry, negative electrode current collector exposed portions were formed on both sides of the negative electrode current collector at the both ends. The negative electrode current collector exposed portion was formed in such a position that it faced the positive electrode current collector exposed portion after spirally winding the electrodes. Then, the resultant negative electrode current collector was dried and pressed by a roll pressing machine, followed by cutting into 52 mm×350 mm, thereby obtaining a negative electrode.

Gel Electrolyte

Ethylene carbonate (EC) and propylene carbonate (PC) were mixed together in a 6:4 ratio, and $LiPF_6$ as an electrolyte salt was dissolved in the mixed solvent in a concentration of 0.7 mol/kg to prepare a non-aqueous electrolytic solution. Then, vinylidene fluoride (VdF) copolymerized with hexafluoropropylene (HFP) in an amount of 6.9%, dimethyl carbonate (DMC) as a diluent solvent, and the non-aqueous electrolytic solution were mixed with one another and dissolved by stirring to obtain a sol electrolyte solution.

The electrolyte solution obtained was uniformly applied to the surfaces of the positive electrode and negative electrode so that the cathode active material layer and anode active material layer were individually impregnated with the electrolyte solution, and then the resultant positive electrode and negative electrode were allowed to stand at room temperature for 8 hours to vaporize and remove dimethyl carbonate (DMC), thereby obtaining a gel electrolyte layer.

Then, the positive electrode and negative electrode each having a gel electrolyte layer formed thereon and a separator disposed between the positive and negative electrodes were stacked and spirally wound together to prepare a battery element. The battery element prepared was covered with an aluminum laminated film having a thickness of 100 μm, and a positive electrode terminal and a negative electrode terminal were exposed outside the aluminum laminated film, and then the aluminum laminated film around the battery element was sealed to form a test battery.

Example 2

A test battery was prepared in substantially the same manner as in Example 1 except that the positive electrode was changed to that using an insulating member comprised of polyethylene terephthalate (PET) in the outer side of the battery.

Example 3

A test battery was prepared in substantially the same manner as in Example 1 except that the positive electrode was changed to that using an insulating member comprised of polypropylene (PP) in the outer side of the battery.

Example 4

A test battery was prepared in substantially the same manner as in Example 1 except that the positive electrode was changed to that using an insulating member comprised of high density polyethylene (HDPE) in the outer side of the battery.

Example 5

A test battery was prepared in substantially the same manner as in Example 1 except that the positive electrode was changed to that using an insulating member comprised of low density polyethylene (LDPE) in the outer side of the battery.

Example 6

A test battery was prepared in substantially the same manner as in Example 1 except that the positive electrode was changed to that using an insulating member comprised of polyphenylene sulfide (PPS) in the inner side of the battery.

Example 7

A test battery was prepared in substantially the same manner as in Example 1 except that the positive electrode was changed to that using an insulating member comprised of polyphenylene sulfide (PPS) in the inner side of the battery and using an insulating member comprised of polyethylene terephthalate (PET) in the outer side of the battery.

Example 8

A test battery was prepared in substantially the same manner as in Example 1 except that the positive electrode was changed to that using an insulating member comprised of polyphenylene sulfide (PPS) in the inner side of the battery and using an insulating member comprised of polypropylene (PP) in the outer side of the battery.

Example 9

A test battery was prepared in substantially the same manner as in Example 1 except that the positive electrode was changed to that using an insulating member comprised of polyphenylene sulfide (PPS) in the inner side of the battery and using an insulating member comprised of high density polyethylene (HDPE) in the outer side of the battery.

Example 10

A test battery was prepared in substantially the same manner as in Example 1 except that the positive electrode was changed to that using an insulating member comprised of polyphenylene sulfide (PPS) in the inner side of the battery and using an insulating member comprised of low density polyethylene (LDPE) in the outer side of the battery.

Example 11

A test battery was prepared in substantially the same manner as in Example 1 except that the positive electrode was changed to that using an insulating member comprised of polyethylene naphthalate (PEN) in the inner side of the battery and using an insulating member comprised of polypropylene (PP) in the outer side of the battery.

Example 12

A test battery was prepared in substantially the same manner as in Example 1 except that the positive electrode was changed to that using an insulating member comprised of polyethylene naphthalate (PEN) in the inner side of the battery and using an insulating member comprised of high density polyethylene (HDPE) in the outer side of the battery.

Example 13

A test battery was prepared in substantially the same manner as in Example 1 except that the positive electrode was changed to that using an insulating member comprised of polyethylene naphthalate (PEN) in the inner side of the battery and using an insulating member comprised of low density polyethylene (LDPE) in the outer side of the battery.

Example 14

A test battery was prepared in substantially the same manner as in Example 1 except that the positive electrode was changed to that using an insulating member comprised of polyethylene terephthalate (PET) in the inner side of the battery and using an insulating member comprised of polypropylene (PP) in the outer side of the battery.

Example 15

A test battery was prepared in substantially the same manner as in Example 1 except that the positive electrode was changed to that using an insulating member comprised of polyethylene terephthalate (PET) in the inner side of the battery and using an insulating member comprised of high density polyethylene (HDPE) in the outer side of the battery.

Example 16

A test battery was prepared in substantially the same manner as in Example 1 except that the positive electrode was changed to that using an insulating member comprised of polyethylene terephthalate (PET) in the inner side of the battery and using an insulating member comprised of low density polyethylene (LDPE) in the outer side of the battery.

Example 17

A test battery was prepared in substantially the same manner as in Example 1 except that the positive electrode was changed to that using an insulating member comprised of polypropylene (PP) in the inner side of the battery and using an insulating member comprised of high density polyethylene (HDPE) in the outer side of the battery.

Example 18

A test battery was prepared in substantially the same manner as in Example 1 except that the positive electrode was changed to that using an insulating member comprised of polypropylene (PP) in the inner side of the battery and using an insulating member comprised of low density polyethylene (LDPE) in the outer side of the battery.

Example 19

A test battery was prepared in substantially the same manner as in Example 1 except that the positive electrode was changed to that using an insulating member comprised of polyethylene naphthalate (PEN) in the inner side of the battery and using an insulating member comprised of polyethylene terephthalate (PET) in the outer side of the battery.

Comparative Example 1

A test battery was prepared in substantially the same manner as in Example 1 except that the positive electrode was changed to that using an insulating member comprised of polyethylene terephthalate (PET) in both the inner side and the outer side of the battery.

Comparative Example 2

A test battery was prepared in substantially the same manner as in Example 1 except that the positive electrode was changed to that using an insulating member comprised of polyimide (PI) in both the inner side and the outer side of the battery.

Comparative Example 3

A test battery was prepared in substantially the same manner as in Example 1 except that the positive electrode was changed to that using an insulating member comprised of polypropylene (PP) in both the inner side and the outer side of the battery.

Comparative Example 4

A test battery was prepared in substantially the same manner as in Example 1 except that the positive electrode was changed to that using an insulating member comprised of polypropylene (PP) in the inner side of the battery and using an insulating member comprised of polyethylene terephthalate (PET) in the outer side of the battery.

Evaluation of Battery Deformation

With respect to each of the test batteries prepared above, a constant current charging was conducted at a charging current of 0.5 A, and switched to a constant voltage charging at a point in time when the charged voltage reached 6.0 V, and then the charging was stopped when the total charging time was 3 hours. A thickness of the battery was measured by a vernier caliper before and after the charging, and deformation of the battery was determined from the formula: {(Battery thickness after charging−Battery thickness before charging)/Battery thickness before charging}×100.

Evaluation of Battery Temperature

With respect to each of the test batteries prepared above, a surface temperature of the battery was measured by a thermocouple.

The results of the measurements are shown in Table 2 below. The melting points of the resins used as materials for the insulating members in the Examples are shown in Table 1. The melting point of resin was measured using a differential scanning calorimeter (DSC). In the measurement, a 0.1-mm specimen was cut according to the form of a container for 5 mg measurement, and placed in the measurement machine, and then the temperature was elevated at 10° C./min to obtain a DSC curve, and the temperature at the top of the peak of melting point on the DSC curve was determined as a melting point. In this instance, α-alumina powder having a volume equivalent to that of the specimen was used as a reference and placed in a separate container.

TABLE 1

| Material for insulating member | Melting point (° C.) |
|---|---|
| Polyimide (PI) | — |
| Polyphenylene sulfide (PPS) | 287 |
| Polyethylene naphthalate (PEN) | 265 |
| Polyethylene terephthalate (PET) | 253 |
| Polypropylene (PP) | 163 |
| High density polyethylene (HDPE) | 130 |
| Low density polyethylene (LDPE) | 109 |

TABLE 2

| | Insulating tape material | | Temperature difference between insulating tape materials (° C.) | Change of thickness (%) | Battery temperature (° C.) |
|---|---|---|---|---|---|
| | Inner side | Outer side | | | |
| Example 1 | PI | PEN | — | 15 | 112 |
| Example 2 | PI | PET | — | 16 | 115 |
| Example 3 | PI | PP | — | 9 | 99 |
| Example 4 | PI | HDPE | — | 6 | 95 |
| Example 5 | PI | LDPE | — | 4 | 90 |
| Example 6 | PPS | PEN | 22 | 15 | 113 |
| Example 7 | PPS | PET | 34 | 16 | 111 |
| Example 8 | PPS | PP | 124 | 9 | 98 |
| Example 9 | PPS | HDPE | 157 | 6 | 94 |
| Example 10 | PPS | LDPE | 178 | 5 | 88 |
| Example 11 | PEN | PP | 102 | 9 | 98 |
| Example 12 | PEN | HDPE | 135 | 6 | 96 |
| Example 13 | PEN | LDPE | 156 | 4 | 89 |
| Example 14 | PET | PP | 90 | 10 | 97 |
| Example 15 | PET | HDPE | 123 | 6 | 96 |
| Example 16 | PET | LDPE | 144 | 4 | 90 |
| Example 17 | PP | HDPE | 33 | 7 | 97 |
| Example 18 | PP | LDPE | 54 | 5 | 90 |
| Example 19 | PEN | PET | 12 | 32 | 112 |
| Comparative Example 1 | PET | PET | 0 | 40 | 112 |
| Comparative Example 2 | PI | PI | — | 55 | 111 |
| Comparative Example 3 | PP | PP | 0 | 55 | 124 |
| Comparative Example 4 | PP | PET | −90 | 58 | 127 |

In Table 2, the negative value for temperature difference indicates that the melting point of the insulating member positioned in the outer side of the battery is higher than the melting point of the insulating member positioned in the inner side of the battery.

As can be seen from the results, in each of Examples 1 to 19 in which the melting point of the insulating member positioned in the outer side of the battery is lower than the melting point of the insulating member positioned in the inner side of the battery, the deformation of battery is remarkably reduced, as compared to the deformation in Comparative Examples 1 to 3 in which the same insulating member is used in the outer side and inner side of the battery and Comparative Example 4 in which the melting point of the insulating member positioned in the outer side of the battery is higher than the melting point of the insulating member positioned in the inner side.

The deformation in each of Examples 1 to 18, in which the difference in melting point between the insulating members positioned in the inner side and outer side of the battery is 20° C. or higher, is half or less of the deformation in Example 19 in which the melting point of the insulating member positioned in the outer side of the battery is lower by 12° C. than the melting point of the insulating member positioned in the inner side of the battery. From this, it is apparent that this range is preferred for reducing the deformation of battery. Further, in this range, the battery temperature is as low as 120° C. or less, and a thermal runaway is unlikely to occur.

When the difference in melting point between the insulating members positioned in the inner side and outer side of the battery is 100° C. or higher, the deformation of battery is advantageously smaller than 10%, so that such a temperature difference is preferable. It is found that, in almost all the Examples, the battery temperature is lower than 100° C. and the safety is improved.

It is found that, even when the difference in melting point is less than 100° C., by using low density polyethylene (LDPE) or high density polyethylene (HDPE) in the insulating member in the outer side of the battery, the deformation of battery can be advantageously as small as less than 10% and the battery temperature can be advantageously as low as less than 100° C.

Hereinabove, one embodiment is described in detail, but the present application is not limited to the above embodiment, and can be changed or modified based on the technical concept of the present application.

For example, the values mentioned in the above embodiment are merely examples, and values different from them can be used if necessary.

The structure of the battery can be applied not only to the flat battery covered with a laminated film but also to a cylindrical battery, prismatic battery, or the like having a spirally wound structure. Further, an arbitrary material can be used in the casing for battery.

Also, the outer side of the battery surely causes short-circuiting sooner than the other portions in the battery, so that short-circuiting is unlikely to occur in the inner side of the battery, from which heat-discharging is difficult to remove. Accordingly, abnormal heat generation of the battery and deformation of the battery pack can be reduced or prevented.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolyte secondary battery, comprising:
a stacked electrode assembly which includes
a positive electrode including a cathode active material layer and a positive electrode current collector,
a negative electrode including an anode active material layer and a negative electrode current collector, and
a separator,
wherein the stacked electrode assembly has a winding start end corresponding to a battery innermost end of the stacked electrode assembly and a winding terminal end corresponding to a battery outermost end of the stacked electrode assembly, respectively,
wherein a first insulating member is attached to a first exposed portion of at least one of the positive electrode current collector and the negative electrode current collector at the winding start end of the stacked electrode assembly,
wherein a second insulating member is attached to a second exposed portion of at least one of the positive electrode current collector and the negative electrode current collector at the winding terminal end of the stacked electrode assembly, wherein the first insulating member and the second insulating member each have a thickness of 10 µm to 100 µm, and wherein a difference between a melting point of the first insulating member and a melting point of the second insulating member is 100° C. or more.

2. The non-aqueous electrolyte secondary battery according to claim 1, wherein the first insulating member is formed on both sides of the first exposed portion of the positive electrode current collector at the winding start end of the positive electrode, and the second insulating member is formed on both sides of the second exposed portion of the positive electrode current collector at the winding terminal end of the positive electrode.

3. The non-aqueous electrolyte secondary battery according to claim 1, wherein the first insulating member and the second insulating member are not formed in the negative electrode.

4. The non-aqueous electrolyte secondary battery according to claim 1, wherein the first insulating member and second insulating member are formed so that the first and second exposed portions of the positive electrode current collector and the first and second exposed portions of the negative electrode current collector do not face each other through only the separator.

5. The non-aqueous electrolyte secondary battery according to claim 1, wherein the second insulating member is selected from the group consisting of low density polyethylene and high density polyethylene.

6. The non-aqueous electrolyte secondary battery according to claim 1, wherein a melting point of the first insulating member and a melting point of the second insulating member are different.

7. The non-aqueous electrolyte secondary battery according to claim 1, wherein the second insulating member has a melting point lower than that of the first insulating member.

8. The non-aqueous electrolyte secondary battery according to claim 1, wherein a difference between a melting point of the first insulating member and a melting point of the second insulating member ranges from 100° C. to 178° C.

9. The non-aqueous electrolyte secondary battery according to claim 1, wherein the first insulating member is selected from the group consisting of a polypropylene resin, a polyethylene terephthalate resin, a polyethylene naphthalate resin, a polyphenylene sulfide resin and a polyimide resin.

10. The non-aqueous electrolyte secondary battery according to claim 1, wherein the second insulating member is selected from the group consisting of a low density polyethylene resin, a high density polyethylene resin, a polypropylene resin, a polyethylene terephthalate resin, a polyethylene naphthalate resin and a polyphenylene sulfide resin.

* * * * *